United States Patent
Apfelbaum et al.

(10) Patent No.: US 12,367,056 B2
(45) Date of Patent: Jul. 22, 2025

(54) RELIABLE DEVICE ASSIGNMENT FOR VIRTUAL MACHINE BASED CONTAINERS

(71) Applicant: RED HAT, INC., Raleigh, NC (US)

(72) Inventors: Marcel Apfelbaum, Afula (IL); Gal Hammer, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 653 days.

(21) Appl. No.: 17/448,761

(22) Filed: Sep. 24, 2021

(65) Prior Publication Data

US 2023/0101885 A1    Mar. 30, 2023

(51) Int. Cl.
*G06F 9/455*    (2018.01)

(52) U.S. Cl.
CPC ............. *G06F 9/45558* (2013.01); *G06F 2009/45579* (2013.01); *G06F 2009/45591* (2013.01)

(58) Field of Classification Search
CPC ....... G06F 9/45558; G06F 2009/45579; G06F 2009/45591; G06F 9/455
USPC ............................................................. 718/1
See application file for complete search history.

(56) References Cited

U.S. PATENT DOCUMENTS

| | | |
|---|---|---|
| 7,917,811 B2 | 3/2011 | Yamamoto |
| 8,028,040 B1 | 9/2011 | Hobbs et al. |
| 8,503,468 B2 | 8/2013 | Akyol et al. |
| 8,850,426 B2 | 9/2014 | Glikson et al. |
| 8,930,568 B1* | 1/2015 | Chalmer ............... G06F 13/10 707/705 |
| 10,846,145 B2 | 11/2020 | Xu et al. |
| 2004/0128670 A1* | 7/2004 | Robinson ............ G06F 9/45558 718/1 |
| 2004/0187106 A1* | 9/2004 | Tanaka ................ G06F 11/1484 718/1 |
| 2007/0266179 A1* | 11/2007 | Chavan ............... G06F 13/4022 709/250 |
| 2015/0149996 A1 | 5/2015 | Tsirkin et al. |
| 2017/0147370 A1* | 5/2017 | Williamson ........ G06F 9/45545 |
| 2017/0289060 A1* | 10/2017 | Aftab .................. H04L 67/1097 |
| 2017/0344270 A1* | 11/2017 | Sterin .................. G06F 3/0632 |
| 2018/0039594 A1 | 2/2018 | Apfelbaum et al. |
| 2018/0357086 A1* | 12/2018 | Kinsella ................ G06F 9/5077 |

(Continued)

FOREIGN PATENT DOCUMENTS

| | | | | |
|---|---|---|---|---|
| CN | 109639455 A | * | 4/2019 | ......... G06F 9/45558 |
| WO | WO-2022095844 A1 | * | 5/2022 | ........... G06F 16/172 |

OTHER PUBLICATIONS

Jing et al. CN109639455A Description Translation, Apr. 16, 2019, <https://worldwide.espacenet.com/publicationDetails/description?CC=CN&NR=109639455A&KC=A&FT=D&ND=3&date=20190416&DB=&locale=en_EP>, pp. 1-12 (Year: 2019).*

(Continued)

*Primary Examiner* — Aimee Li
*Assistant Examiner* — Hsing Chun Lin
(74) *Attorney, Agent, or Firm* — Womble Bond Dickinson (US) LLP

(57) ABSTRACT

A device attachment request to attach a device to a container within a virtual machine is received. The virtual machine is monitored to determine whether the virtual machine is ready for a hot-plug of the device. An indication that the virtual machine is ready for the hot-plug of the device is received from the virtual machine. A device hot-plug operation is issued to cause the device to be hot-plugged to the virtual machine.

11 Claims, 4 Drawing Sheets

(56) References Cited

U.S. PATENT DOCUMENTS

2018/0357089 A1* 12/2018 Tsirkin ............... G06F 11/3442
2021/0141655 A1    5/2021 Gamage et al.

OTHER PUBLICATIONS

Jiang, WO2022095844A1 Description Translation, May 12, 2022, <https://worldwide.espacenet.com/publicationDetails/description?CC=WO&NR=2022095844A1&KC=A1&FT=D&ND=4&date=20220512&DB=&locale=en_EP>, pp. 1-19 (Year: 2022).*
"Add a PCI Device to a Virtual Machine" (2021). VMware, Inc. pp. 5.
"Proxmox VE Administration Guide" (May 7, 2021). Proxmox Server Solutions GmbH, pp. 357.
Extended European Search Report mailed on May 6, 2022 for European Patent Application No. 21209240.7.

* cited by examiner

RELIABLE DEVICE ASSIGNMENT FOR VIRTUAL MACHINE BASED CONTAINERS

TECHNICAL FIELD

Aspects of the present disclosure relate to a microservice architecture, and more particularly, to reliable device assignment for virtual machine based containers.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
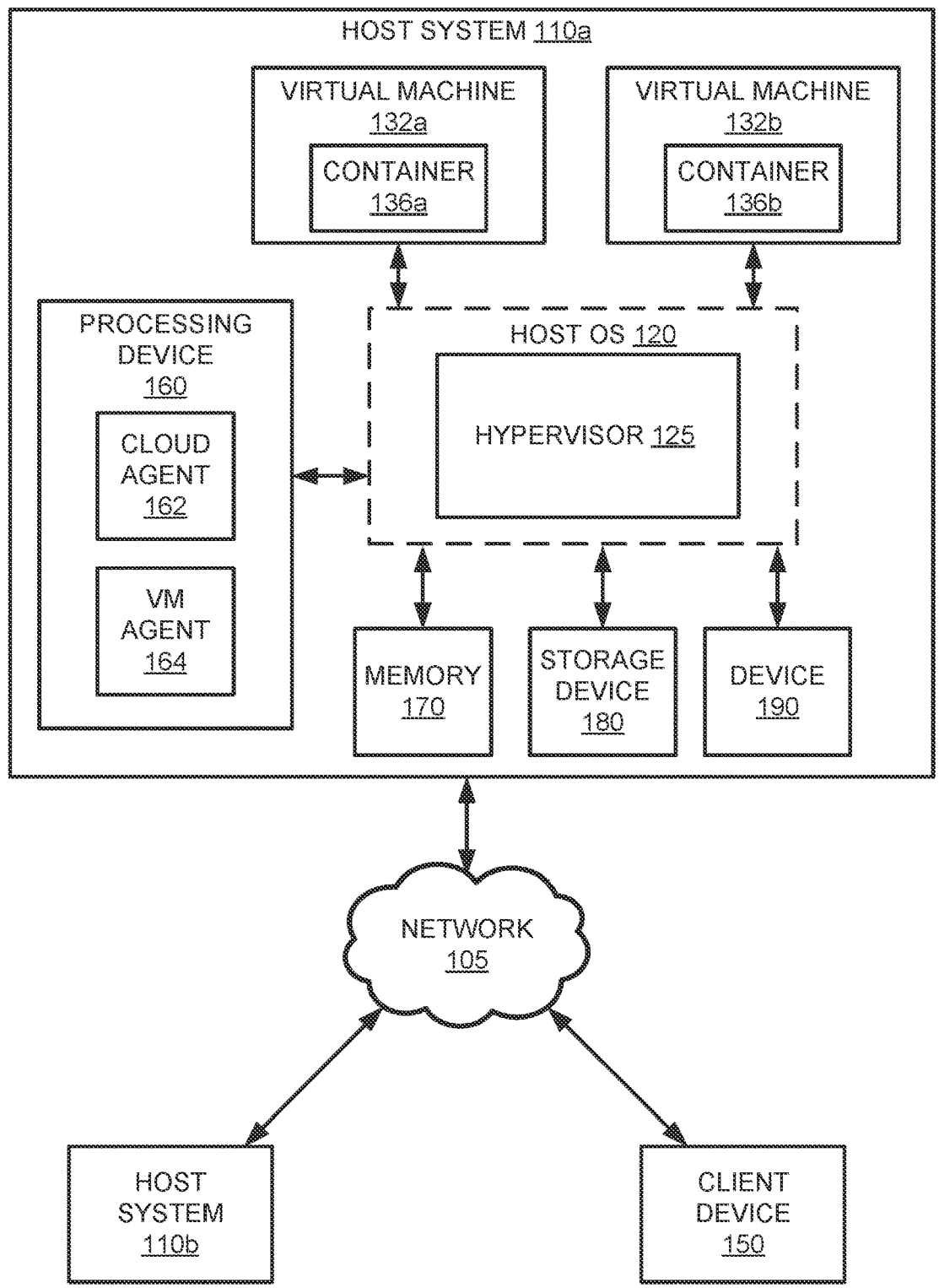
FIG. 1 is a block diagram that illustrates an example computing architecture, in accordance with some embodiments.

In a microservice architecture, containers may be created on host systems of a cloud to execute various services of applications. In some implementations, the containers are created within virtual machines (VMs) that are supported by the host systems. Devices may be added to the virtual machines supporting the containers to provide additional functionality to the containers. For example, one or more devices may be added (also referred to as "attached" hereafter) to the virtual machines to provide network connectivity or storage for the containers.

In a conventional microservice architecture, containers are first created and then the devices, such as network or storage devices, are attached to the container. In other words, the attachment of the devices occurs once the container is created. In the above example where the container is within a VM, this may result in a race between the guest operating system (OS) boot process of the VM and the time of the attachment of the devices was triggered. In such an instance, the device subsystem of the VM may not be ready to receive device attachments during the boot process, resulting in the device unsuccessfully being attached to the virtual machine.

To remedy this, some conventional microservice architectures may utilize a pre-configured "wait period" (e.g., 3 seconds) to ensure the guest OS of the VM is ready for the device to be attached. The use of a wait period, however, is unreliable because the amount of time for the guest OS to be ready may exceed the wait period, resulting in the device unsuccessfully being attached to the VM. Furthermore, the use of a wait period may increase the creation time of these VM-based containers if the guest OS is ready before the wait period has elapsed, decreasing the performance of the conventional microservice architecture.

Aspects of the disclosure address the above-noted and other deficiencies by utilizing reliable device assignment for virtual machine based containers. When a virtual machine based container is created and device attachment request is received, processing logic of a processing device may delay the issuing of the device attachment request. In some embodiments, the device may be a Peripheral Component Interconnect (PCI) device. The processing logic may monitor the VM of the VM based container to determine when the guest OS of the VM is ready for a hot-plug of the device. A hot-plug of the device may correspond to the addition/attachment of the device to the VM while bypassing a restart or shutdown of the VM.

To determine whether the VM is ready for a hot-plug of the device, a hypervisor of the host system may poll the registers of the VM, which are updated by the guest OS during the boot process, to determine whether the VM is ready for the hot-plug of the device. For example, for a PCI device attachment request, the hypervisor may poll the emulated PCI controller registers of the VM to determine whether the VM is ready for the hot-plug of the PCI device. Once the VM is ready for the hot-plug of the device, the hypervisor may transmit an indication that is received by the processing logic. Upon receipt of the indication, the processing logic may issue the device attachment operation, which causes the device to be attached to the VM.

Polling the VM registers to determine whether the VM is ready for a hot-plug of a device before issuing the device attachment operation ensures that the VM is ready for the attachment of the device, decreasing the chances of an unsuccessful attachment of the device and improving the performance of the microservice architecture. Furthermore, by polling the VM registers the amount of time to create a VM based container is reduced compared to using a pre-configured wait time, increasing the performance of the microservice architecture.

FIG. 1 depicts a high-level component diagram of an illustrative example of a computing architecture 100, in accordance with one or more aspects of the present disclosure. However, other computing architectures 100 are possible, and the implementation of a computer system utilizing examples of the disclosure are not necessarily limited to the specific architecture depicted by FIG. 1.

As shown in FIG. 1, computing architecture 100 includes host systems 110a, b and client device 150. The host systems 110a, b and client device 150 include one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host systems 110*a, b* and client device 150 may include multiple processing devices, storage devices, or devices. Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like.

The host systems 110*a, b* and client device 150 may be a server, a mainframe, a workstation, a personal computer (PC), a mobile phone, a palm-sized computing device, etc. In embodiments, host systems 110*a, b* and client device 150 may be separate computing devices. In some embodiments, host systems 110*a, b* and client device 150 may be implemented by a single computing device. For clarity, some components of host system 110*b* and client device 150 are not shown. Although computing architecture 100 is illustrated as having two host systems, embodiments of the disclosure may utilize any number of host systems.

Host systems 110*a, b* may additionally include containers 136*a, b* residing within virtual machines 132*a, b*, and host operating system (OS) 120. VM 132*a, b* are software implementations of machines that execute programs as though they were actual physical machines. Containers 136*a, b* act as isolated execution environments for different workloads of services, as previously described. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 132*a, b* and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110*a, b* and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110*a, b* and client device 150.

In embodiments, processing device 160 may execute a cloud agent 162. The cloud agent 162 may create VM based containers on host systems (e.g., host systems 110*a, b*) of the computer architecture. The cloud agent 162 may further generate device attachment requests to attach devices to the VM based containers and subsequently attach the devices to the VM based containers.

In some embodiments, processing device 160 may execute a VM agent 164. The VM agent 164 may receive device attachment requests for VM based containers from the cloud agent 162. The VM agent 164 may further monitor the VM based container to determine when the VM based container is ready for the hot-plugging of device(s) associated with the device attachment requests. The VM agent 164 may issue device attachment operations upon determining that the VM cased container is ready for the hot-plugging of the devices. Further details regarding cloud agent 162 and VM agent 164 will be discussed at FIGS. 2-4 below.

Figure 2:
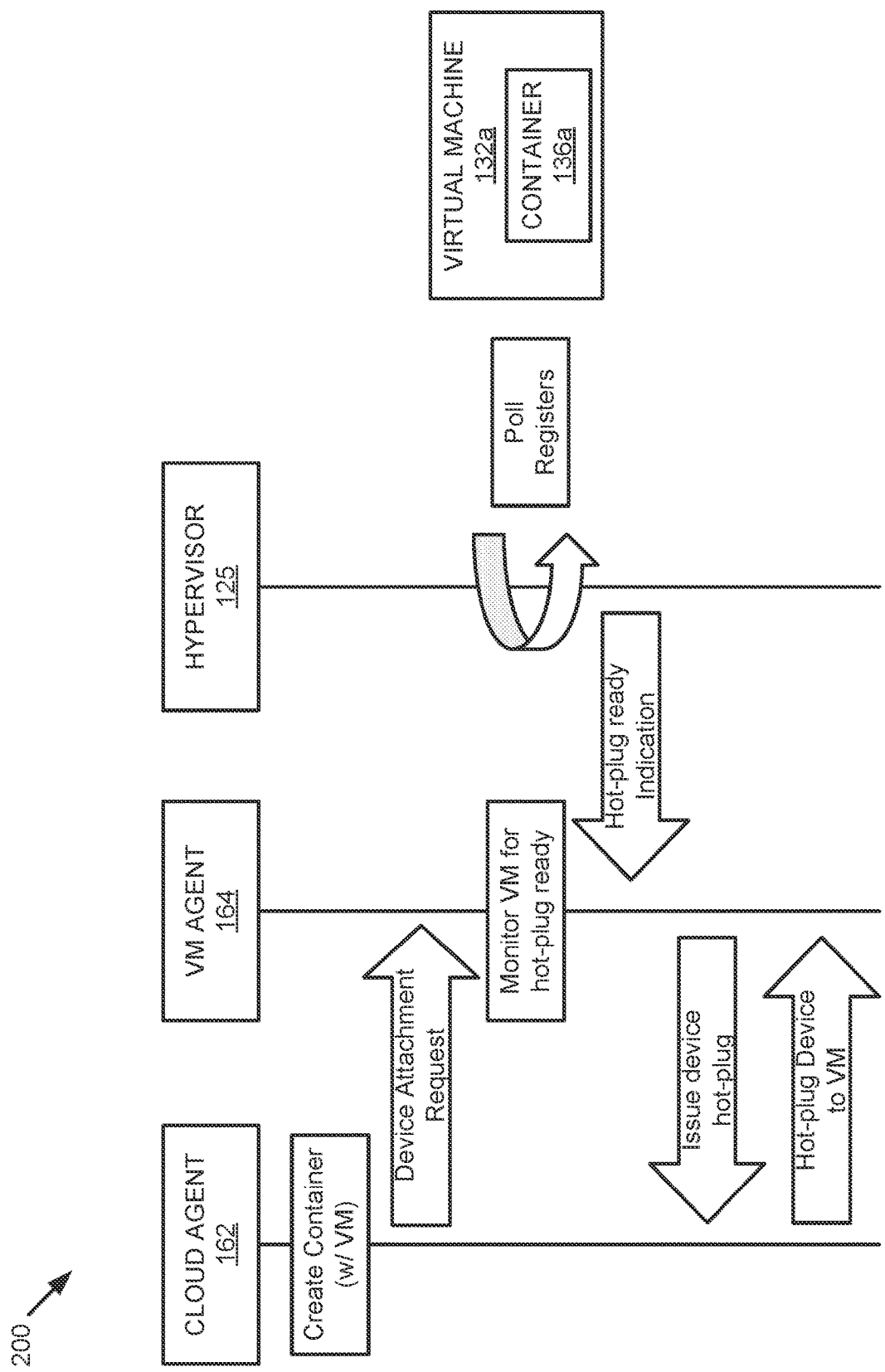
FIG. 2 is an illustration of an example process flow of attaching a device to a virtual machine (VM) based container, in accordance with embodiments of the disclosure.

FIG. 2 is an illustration of an example process flow 200 of attaching a device to a VM based container, in accordance with embodiments of the disclosure. The process flow 200 includes a cloud agent 162, VM agent 164, hypervisor 125, and a VM based container (e.g., container 136*a* within virtual machine 132*a*), as previously described at FIG. 1.

The process flow 200 may begin with the cloud agent 162 creating a VM based container on a host system (e.g., host system 110*a* or host system 110*b* of FIG. 1), which causes the boot process of the VM based container to begin. For example, the cloud agent 162 may create container 136*a* within virtual machine 132*a*, which are supported by host system 110*a*

Upon creation of the VM based container, the cloud agent 162 may issue a device attachment request for one or more devices (e.g., device 190 of FIG. 1) that are to be attached to the VM based container. For example, the cloud agent may issue a device attachment request for a network device and/or storage device to be attached to the VM based container to enable access to the devices by the container 136*a*. In embodiments, the device may be a PCI device and the device attachment request may correspond to a PCI device attachment request. In some embodiments, the device attachment request may be received by the VM agent 164. In other embodiments, the device attachment request may be received by a container runtime (not shown) of the container 136*a* and the container runtime may forward the device attachment request to the VM agent 164.

Upon receiving the device attachment request, the VM agent 164 may monitor the virtual machine 132*a* to determine when the virtual machine 132*a* is ready for the hot-plugging of devices. To determine when the virtual machine 132*a* is ready for the hot-plugging of devices, the VM agent 164 may wait until the VM agent 164 has received an indication that the virtual machine 132*a* is ready for the hot-plugging of devices.

In embodiments, the hypervisor 125 may poll the registers of virtual machine 132*a* to determine whether the VM is ready for the hot-plugging of devices. To poll the registers, the hypervisor 125 may wait for the virtual machine 132*a* to check for the readiness of the registers for the hot-plugging of devices. The registers may correspond to a configuration space for the devices being attached to the virtual machine 132*a*. In some embodiments, the registers may correspond to emulated PCI controller registers that are updated by the guest OS of the virtual machine 132*a* during the boot process. In some embodiments, if the amount of time the hypervisor 125 polls the virtual machine 132*a* exceeds a threshold, the operation may timeout.

Once the hypervisor 125 determines that the registers of the virtual machine 132*a* are ready for the hot-plugging of devices, the hypervisor 125 may transmit an indication to the VM agent 164 that the virtual machine 132*a* is ready for the hot-plugging of devices. Upon receipt of the indication, the VM agent 164 may issue a device hot-plug operation to the cloud agent 162 that causes the cloud agent 162 to attach the device associated with the device attachment request to the virtual machine 132*a* via a hot-plug operation. Because the VM agent has issued the device hot-plug operation to the cloud agent 162 after receiving the indication that the virtual machine 132*a* is ready for the hot-plugging of devices, the probability that the device may be successfully hot-plugged to virtual machine 132*a* is increased.

It should be noted that the operations and components shown in process flow 200 are shown for illustrative purposes only. Embodiments of the disclosure may have these operations being performed by different components, in different orders, and/or may include one or more intervening operations.

Figure 3:
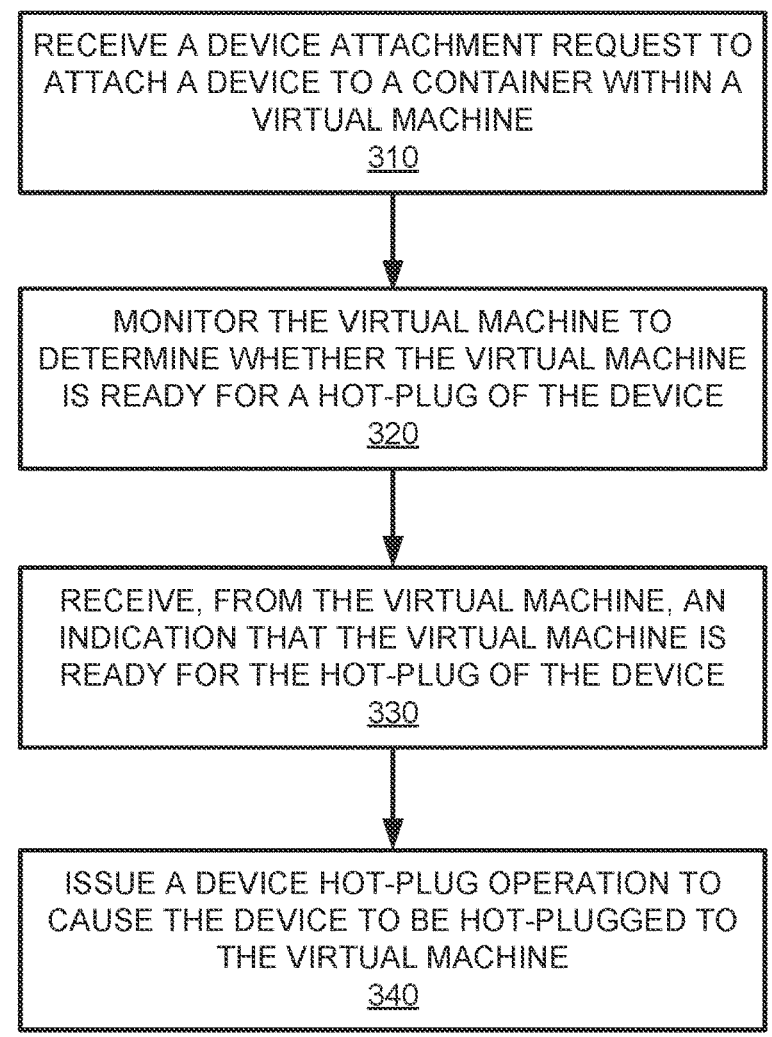
FIG. 3 is a flow diagram of a method of reliably attaching a device to a VM based container, in accordance with some embodiments.

FIG. 3 is a flow diagram of a method 300 of reliably attaching a device to a VM based container, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by VM agent 164 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic receives a device attachment request to attach a device to a container within a virtual machine.

At block 320, the processing logic monitors the virtual machine to determine whether the virtual machine is ready for a hot-plug of the device.

At block 330, the processing logic receives, from the virtual machine, an indication that the virtual machine is ready for the hot-plug of the device.

At block 340, the processing logic issues a device hot-plug operation to cause the device to be hot-plugged to the virtual machine.

Figure 4:
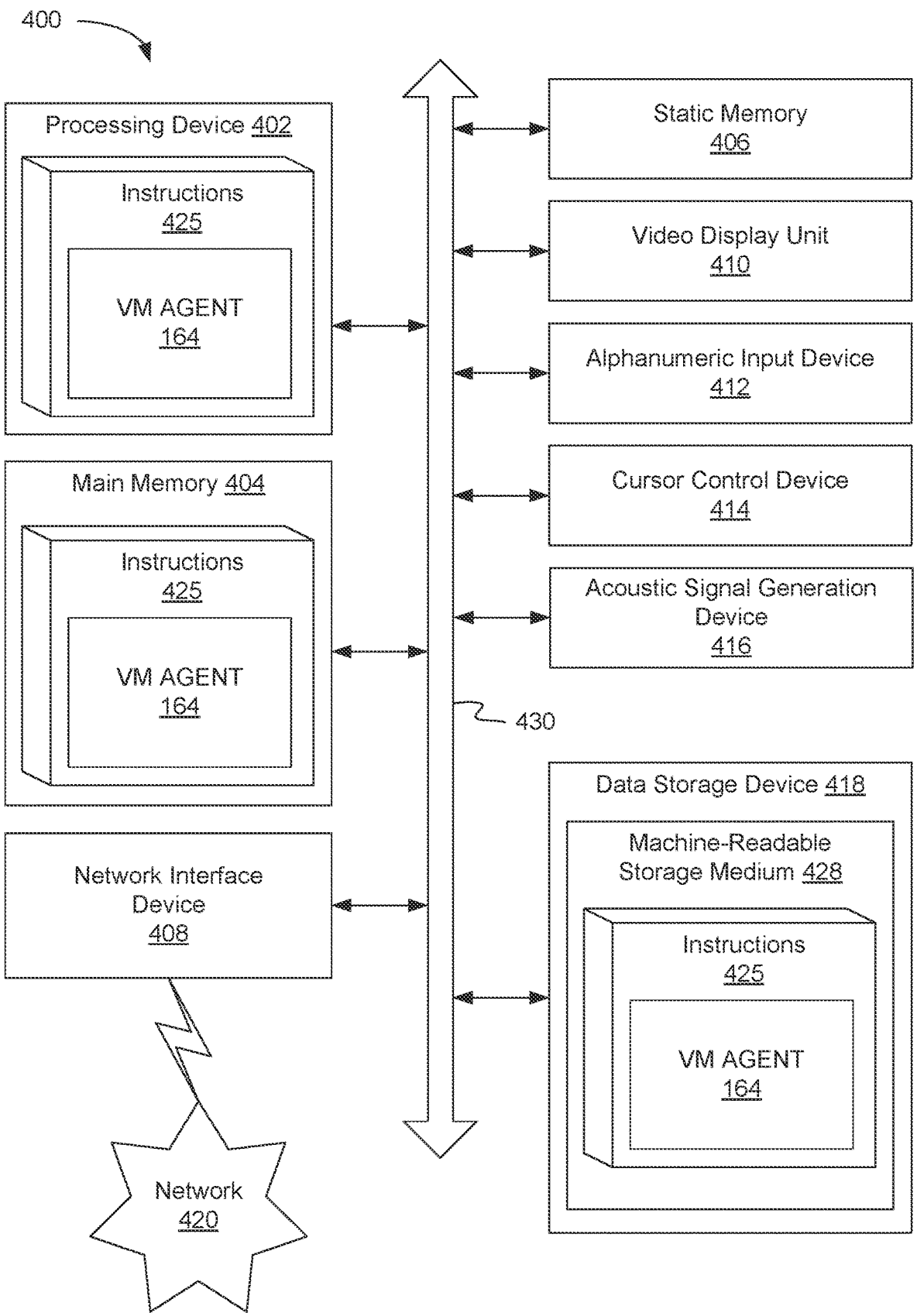
FIG. 4 is a block diagram of an example apparatus that may perform one or more of the operations described herein, in accordance with some embodiments of the present disclosure.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for a VM agent, e.g., VM agent 164, for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "monitoring," "issuing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:
1. A method comprising:
creating, via a virtual machine boot process, a virtual machine to execute on a host operating system, wherein creating the virtual machine updates registers;

creating, via a container boot process, a container within the virtual machine executing on the host operating system;

receiving, by a virtual machine (VM) agent executing on a processing device, a device attachment request to attach a hardware device to the virtual machine after creating the container within the virtual machine;

determining, by a hypervisor of the host operating system, whether the virtual machine is ready for a hot-plug of the hardware device by polling, after creating the container within the virtual machine via the container boot process and before issuing a device hot-plug operation, the registers updated during the virtual machine boot process to prevent errors associated with the hot-plug of the hardware device, wherein the hot-plug of the hardware device corresponds to an attachment of the hardware device to the virtual machine while bypassing a restart of the virtual machine or a shutdown of the virtual machine;

sending, by the hypervisor to the VM agent, a hot-plug ready indication that the virtual machine is ready for the hot-plug of the hardware device responsive to determining that the virtual machine is ready for the hot-plug of the hardware device; and issuing, by the VM agent and responsive to receiving the hot-plug ready indication from the hypervisor, the device hot-plug operation to cause the hardware device to be hot-plugged to the virtual machine.

2. The method of claim 1, wherein the hardware device comprises a Peripheral Component Interconnect (PCI) device.

3. The method of claim 1, further comprising: receiving a request to create the container within the virtual machine from a cloud agent.

4. The method of claim 3, wherein the device attachment request is received from the cloud agent.

5. A system comprising:
a memory; and
a processing device executing a virtual machine (VM) agent, the processing device operatively coupled to the memory, to:
create, via a virtual machine boot process, a virtual machine to execute on a host operating system, wherein creating the virtual machine updates registers;
create, via a container boot process, a container within the virtual machine executing on the host operating system;
receive, by the VM agent, a device attachment request to attach a hardware device to the virtual machine after creating the container within the virtual machine;
determine, using a hypervisor of the host operating system, whether the virtual machine is ready for a hot-plug of the hardware device by polling, after creating the container within the virtual machine via the container boot process and before issuing a device hot-plug operation, the registers updated during the virtual machine boot process to prevent errors associated with the hot-plug of the hardware device, wherein the hot-plug of the hardware device corresponds to an attachment of the hardware device to the virtual machine while bypassing a restart of the virtual machine or a shutdown of the virtual machine;
send, by the hypervisor to the VM agent, a hot-plug ready indication that the virtual machine is ready for the hot-plug of the hardware device responsive to determining that the virtual machine is ready for the hot-plug of the hardware device; and
issue, using the VM agent and responsive to receiving the hot-plug ready indication from the hypervisor, the device hot-plug operation to cause the hardware device to be hot-plugged to the virtual machine.

6. The system of claim 5, wherein the hardware device comprises a Peripheral Component Interconnect (PCI) device.

7. The system of claim 5, wherein the processing device further: receives a request to create the container within the virtual machine from a cloud agent.

8. The system of claim 7, wherein the device attachment request is received from the cloud agent.

9. A non-transitory computer-readable storage medium including instructions that, when executed by a processing device, cause the processing device to:
create, via a virtual machine boot process, a virtual machine to execute on a host operating system, wherein creating the virtual machine updates registers;
create, via a container boot process, a container within the virtual machine executing on the host operating system;
receive, by a virtual machine (VM) agent executing on the processing device, a device attachment request to attach a hardware device to the virtual machine after creating the container within the virtual machine;
determine, using a hypervisor of the host operating system, whether of the virtual machine is ready for a hot-plug of the hardware device by polling, after creating the container within the virtual machine via the container boot process and before issuing a device hot-plug operation, the registers updated during the virtual machine boot process to prevent errors associated with the hot-plug of the hardware device, wherein the hot-plug of the hardware device corresponds to an attachment of the hardware device to the virtual machine while bypassing a restart of the virtual machine or a shutdown of the virtual machine;
send, by the hypervisor to the VM agent, a hot-plug ready indication that the virtual machine is ready for the hot-plug of the hardware device responsive to determining that the virtual machine is ready for the hot-plug of the hardware device; and
issue, using the VM agent and responsive to receiving the hot-plug ready indication from the hypervisor, the device hot-plug operation to cause the hardware device to be hot-plugged to the virtual machine.

10. The non-transitory computer-readable storage medium of claim 9, wherein the hardware device comprises a Peripheral Component Interconnect (PCI) device.

11. The non-transitory computer-readable storage medium of claim 9, wherein the processing device further: receives a request to create the container within the virtual machine from a cloud agent.

\* \* \* \* \*